United States Patent [19]

Moceri

[11] Patent Number: 5,123,309
[45] Date of Patent: Jun. 23, 1992

[54] INTEGRATED SPINDLE ACTUATOR ASSEMBLY FOR NUT-RUNNERS

[75] Inventor: Thomas J. Moceri, Northville, Mich.

[73] Assignee: Ingersoll-Rand Company, Woodcliff Lake, N.J.

[21] Appl. No.: 670,178

[22] Filed: Mar. 15, 1991

[51] Int. Cl.$^5$ .............................................. B25B 17/00
[52] U.S. Cl. .................... 81/57.31; 81/57.35; 81/177.2
[58] Field of Search ............ 81/52, 54, 57.24, 57.31, 81/57.35, 177.2

[56] References Cited

U.S. PATENT DOCUMENTS

| | | | |
|---|---|---|---|
| 3,289,503 | 12/1966 | Klatt | 81/177.2 X |
| 4,376,397 | 3/1983 | Newby et al. | 81/177.2 |
| 4,703,677 | 11/1987 | Rossini | 81/177.2 X |
| 4,754,670 | 7/1988 | Raymond | 81/177.2 |
| 4,782,726 | 11/1988 | Ryder et al. | 81/57.24 X |

*Primary Examiner*—James G. Smith
*Attorney, Agent, or Firm*—Walter C. Vliet

[57] ABSTRACT

Disclosed is an integrated spindle actuator assembly for nut-runners wherein the spindle is pneumatically operated to engage and retract from the intended work device including an internal piston formed on the spindle end in conjunction with a spline which permits the spindle to translate towards the work when pressure fluid is applied to the spindle assembly. In its extended position, rotation of the spindle is possible, the spindle requiring a minimum of radial clearance, thereby permitting close spacing of the nut-runners.

7 Claims, 2 Drawing Sheets

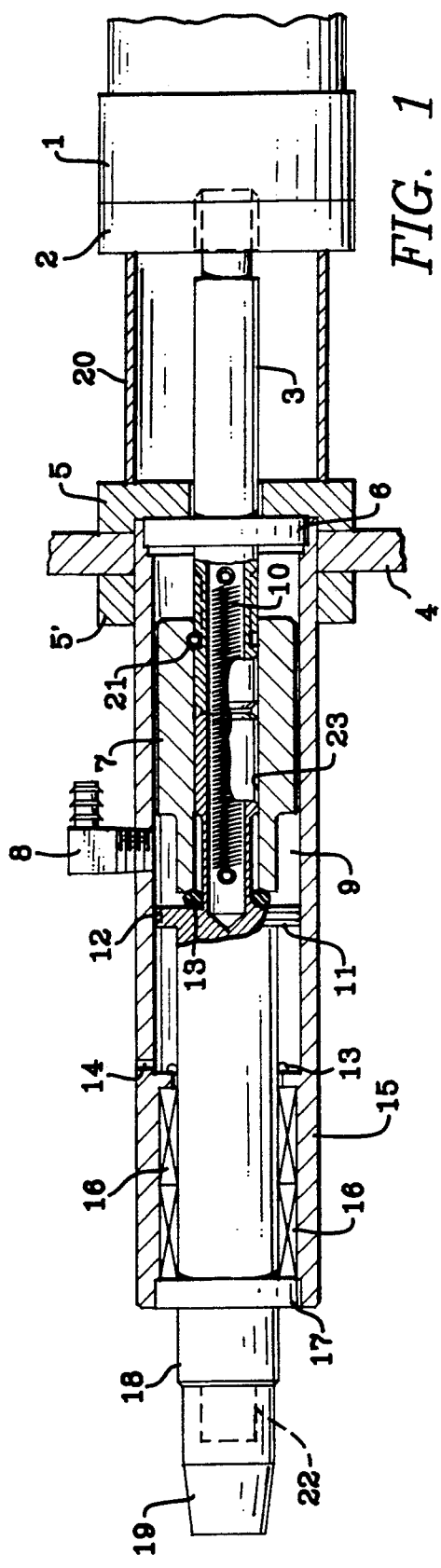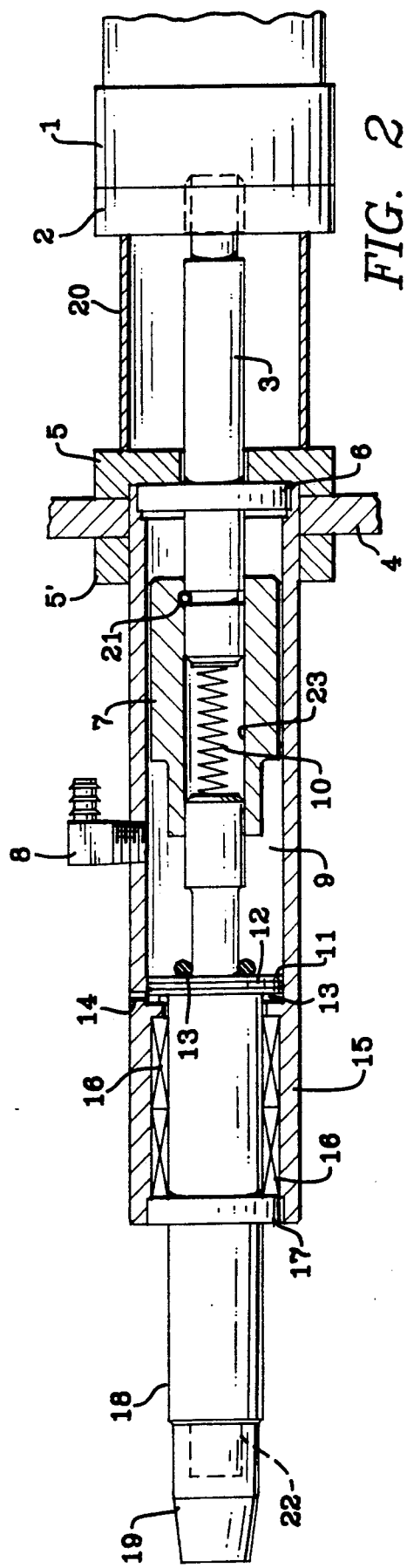

INTEGRATED SPINDLE ACTUATOR ASSEMBLY FOR NUT-RUNNERS

BACKGROUND OF THE INVENTION

This invention relates generally to nut-runners and more particularly to an extensible spindle for a fixture mounted nut-runner. In the past, multiple nut-runner spindles have been advanced or retracted to the work by an external air cylinder. The external air cylinders require room which limits the proximity with which each unit may be placed to one another.

The foregoing illustrates limitations known to exist in present nut-runners. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing an integrated spindle actuator assembly for nut-runners comprising: a rotary drive means having its output on a spindle; a work engaging means; and an extensible means intermediate the rotary drive means and the work engaging means for imparting rotation from the rotary drive means to the work engaging means and for axially traversing said work engaging means to engage a fastener.

The foregoing and other aspects of the invention will become apparent from the following detailed description of the invention when considered in conjunction with the accompanying drawing figures.

BRIEF DESCRIPTION OF THE DRAWINGS

FIG. 1 is a longitudinal section of the spindle actuator assembly in its normal retracted position.

FIG. 2 is a longitudinal section of the spindle actuator assembly in its extended pressurized position.

DETAILED DESCRIPTION

Figure 3:
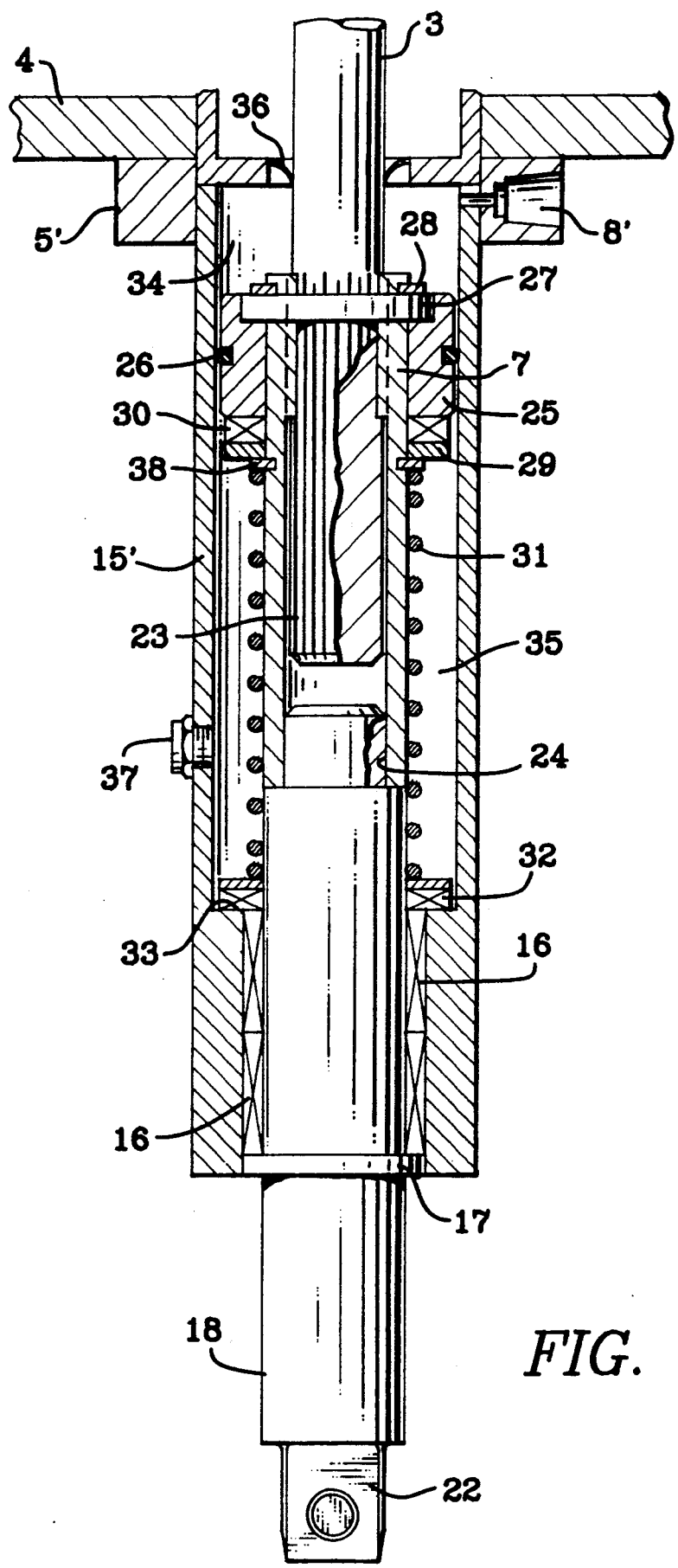
FIG. 3 is a longitudinal section of an alternative embodiment of a spindle actuator assembly according to the present invention in its retracted position.

Referring to FIG. 1, an integrated actuator assembly for a nut-runner is shown having a motor 1 generally of the electric or pneumatic driven type coupled to a reaction torque transducer 2 of the type well known in the industry and having its rotary output on a spindle 3 enclosed in part within an extension housing 20. The extension housing 20 is mounted to a flange 5 which in turn is mounted to a mounting plate 4 for securing and positioning the nut-runner.

In the embodiment shown in FIG. 1, the spindle 3 is shown extending into a chamber 9, formed within a housing 15. The housing 15 is shown attached to a submounting flange 5' which is in turn attached to the mounting plate 4 in concentric axial alignment with the spindle 3. The spindle 3 enters the chamber through a bearing seal 6 at the top end of the housing 15. The spindle 3 is terminated at the end extending into the chamber in a spline 23 which cooperates with a spline driver 7 and the spindle is secured to the spline driver 7 by means of a roll pin 2!. The spline driver 7 is provided with an internal spline in its internal bore which cooperates with the spline on the spindle. Rotation of the spindle 3 is imparted to the spline driver 7 through the spline connection with axial translation along the spline 23 being prevented by the roll pin 21.

An output spindle 18 has a spline formed at its one end which cooperates with the spline driver 7 in its internal spline and is driven thereby. The spline on the output spindle 18 is free to translate axially while being driven in a rotational manner. The output spindle !8 is further provided with an increased diameter portion forming a piston head 11 towards its one end. The piston head is in sealing contact with the inner surface of the cylindrical housing 15 thereby forming a pressure chamber 9 between the piston and the seal bearing 6 within the housing. The output spindle !8 further extends from the piston head 11 through a pair of bearings !6 and a lower housing seal 17 and terminates in a square drive 22 which accepts a drive socket 19. The drive socket 19 in turn engages a fastener head in operation.

Air or other pneumatic pressure fluid is supplied to chamber 9 through air inlet 8 disposed in the periphery of the housing. A vent 14 is provided in the lower housing to allow trapped air to escape when the actuator assembly is operated to extend the drive or output spindle 18. An "O" ring 12 is provided as a seal between the piston and the housing, in addition "O" rings 13 are provided as cushion means to prevent noisy metal to metal contact in operation. An extension spring 10 is provided to retract the output spindle into the spline driver 7.

In operation, pneumatic fluid or other pressure fluid is applied to the air inlet 8 which in turn pressurizes chamber 9. Pressure chamber 9 forces the piston 11 to extend the output spindle 18 to the left as shown in FIG. 2. As the output spindle is extended it in turn elongates extension spring 10. When pressure fluid is removed from the air inlet 8 the extension spring 10 retracts the output spindle into the housing 15.

During the entire process of translating the output spindle to its extended position and return, rotational drive of the output spindle may be accomplished through the spline driver driving the spline on the spindle. Thus, it now may be appreciated by one skilled in the art that a simple and efficient method is provided for extending the spindle as required by simply applying air pressure to the air inlet 8.

An alternative embodiment is shown in FIG. 3, wherein the spline driver 7' is permanently attached to the output spindle 18 at, for example, a brazed joint 24. In this case, the spline driver is translated axially by a piston 25 and the air inlet 8' is placed in the submounting flange 5' to deliver air to a chamber 34 now formed above the spline driver.

The piston 25 is in sliding engagement with the housing 15' and is sealed by means of an "O" ring 26. The spline driver 7' is free to rotate within the piston 25 and is sealed relative to the spline driver 7' by means of a lip seal 27 which is positioned relative to the spindle 3 by means of a snap ring 28. Translation of the piston 25 along the spindle 3 is transmitted to the spline driver 7' through a thrust washer 29 and a thrust bearing 30 which isolates the rotation of the spline driver from the piston 25, yet permits the force generated by the piston to be transmitted to the spline driver in the axial direction.

In the embodiment shown in FIG. 3, a compression spring 31 is utilized to return the spline driver 7' to the retracted position. A thrust bearing 32 isolates the rotation of the spline driver 7' and compression spring 31 from the housing 15' while permitting the reactive force of the spring 31 to act against a lip 33 formed in the housing 15. The piston 25 separates the hollow cylindrical shape of the housing 15' into two effective chambers. The top chamber is closed off by a lip seal 36 which seals the rotary spindle 3 where it enters the chamber. The lower chamber 35 may be vented or pressurized (as will be explained later) through vent 37.

It should be appreciated by one skilled in the art that application of pneumatic fluid, such as air to inlet 8, will pressurize chamber 34 causing piston 25 to move axially downward as shown in FIG. 3. This forces the spline driver 7' downward through thrust bearing 30 against the thrust washer 29 and a snap ring 38 against the return force of compression spring 31. Air compressed in chamber 35 is vented through the vent 37 and the output spindle 18 which is connected to the spline driver is extended outward from the housing 15'.

Release of pneumatic pressure at air inlet 8' permits the compression spring 31 to force the assembly backwards and retract the output spindle 18. It should be appreciated that the compression spring may be omitted if the vent 37 is pressurized with pneumatic fluid, such as air, thereby pressurizing chamber 35 causing the piston assembly 25 to operate in reverse. This retracts the spline driver 7' and its attached output spindle 18.

It should be further appreciated by one skilled in the art that any combination of air pressure at either the air inlet 8' or the vent/return port inlet 37 in combination with or without a return spring may be utilized to accomplish the purpose of the invention.

As may be appreciated now by one skilled in the art this invention provides a simple, reliable means requiring a minimum of radial clearance and a maximum provision for flexibility in application.

Having described the invention, what is claimed is:

1. An integrated spindle actuator assembly for a nut-runner comprising:
    a rotary drive member having its output on a spindle;
    a work engaging member; and
    an extensible drive member extended by a pressure fluid operated piston intermediate said rotary drive means and said work engaging means for imparting rotation from said rotary drive means to said work engaging means and for axially traversing said work engaging means to engage a fastener.

2. An integrated spindle actuator assembly for a nut-runner according to claim 1, wherein said piston is formed on said work engaging member.

3. An integrated spindle actuator assembly for a nut-runner according to claim 2, wherein said work engaging member further comprises:
    an elongated spindle, and said piston sealingly engages a housing concentric about said spindle, said housing forms a pressure chamber for receiving pressure fluid, said spindle being axially displaced in response to pressure fluid being applied to said chamber.

4. An integrated spindle actuator assembly for a nut-runner according to claim 1, wherein said piston is operatively associated with said extensible means.

5. An integrated spindle actuator assembly for a nut-runner according to claim 4, wherein said extensible means comprises a spline driver mounted for translation in a pressurized housing having a piston in driving contact therewith to effect translation of said driver to an extended position.

6. An integrated spindle actuator assembly for a nut-runner according to claim 4, wherein axial translation in one direction is accomplished by said output spindle forming a piston in said housing which moves said output spindle in one direction in response to pressurization of said housing and said output spindle is returned in an opposite direction by a resilient means.

7. An integrated spindle actuator assembly for a nut-runner comprising:
    a motor having its rotary output on a spindle;
    said spindle projecting into a housing axially aligned with said motor;
    said housing containing an extensible means for extending an output spindle from said housing in axial alignment with an input spindle;
    said input spindle being provided with an external spline;
    said output spindle being provided with an external spline coupled together by a spline driver having an internal spline allowing axial translation of one of said input spindle or output spindle; and
    said extension being accomplished by pressurization of said housing to cause said output spindle to be extended from said housing.

* * * * *